United States Patent

Han

Patent Number: 5,903,737
Date of Patent: May 11, 1999

[54] APPARATUS AND METHOD FOR SERIAL DATA COMMUNICATION UTILIZING GENERAL MICROCOMPUTER

[75] Inventor: Choon Deok Han, Taegu, Rep. of Korea

[73] Assignee: LG Electronics Inc., Seoul, Rep. of Korea

[21] Appl. No.: 08/865,779

[22] Filed: May 30, 1997

[30] Foreign Application Priority Data

Mar. 6, 1996 [KR] Rep. of Korea ............ 96-19634

[51] Int. Cl.⁶ .................................... G06F 13/00
[52] U.S. Cl. ............................ 395/280; 395/306
[58] Field of Search ............................ 395/733, 280, 395/286, 306, 309, 290

[56] References Cited

U.S. PATENT DOCUMENTS

| | | | |
|---|---|---|---|
| 4,689,740 | 8/1987 | Philips | 364/200 |
| 4,695,839 | 9/1987 | Barbu et al. | 340/825.06 |
| 4,815,026 | 3/1989 | Barbu et al. | 395/280 |
| 5,226,173 | 7/1993 | Sasaki et al. | 395/800.4 |
| 5,361,374 | 11/1994 | Sasaki et al. | 395/800.43 |
| 5,636,343 | 6/1997 | Asano et al. | 395/800.36 |
| 5,696,994 | 12/1997 | Pang | 395/884 |
| 5,710,890 | 1/1998 | Hermer | 395/286 |
| 5,765,019 | 6/1998 | Asano et al. | 395/800.38 |

FOREIGN PATENT DOCUMENTS

| | | |
|---|---|---|
| 0195290 | 2/1986 | European Pat. Off. . |
| 0246666 | 5/1987 | European Pat. Off. ........ G06F 13/42 |

OTHER PUBLICATIONS

The Microchip Embedded Control Handbook 1994/95, Published Sep. 1994 by Microchip Technology, Inc.

Primary Examiner—Ayaz R. Sheikh
Assistant Examiner—Xuong Chung-Trans
Attorney, Agent, or Firm—Oppenheimer Wolff & Donnelly LLP

[57] ABSTRACT

An apparatus and method for serial data communication capable of performing an inter integrated circuit ($I^2C$) serial data communication utilizing a general microcomputer having no built-in hardware for the $I^2C$ serial communication. In the apparatus, a start condition for a start of serial data transmission or reception is detected by a start condition detecting section utilizing an input serial clock signal and serial data of an $I^2C$ communication type, and a stop condition for a stop of the serial data transmission or reception is detected by a stop condition detecting section utilizing the serial clock and serial data. A microcomputer generates and releases an interrupt for the serial data transmission or reception in accordance with start and stop signals provided from the start and stop condition detecting sections, respectively, and then performs transmission or reception of the serial clock signal and serial data when the interrupt is generated.

4 Claims, 7 Drawing Sheets

FIG. 2A SCL

FIG. 2B SDA

FIG. 5A  SCL  ——————————————— 1 (LOGIC)
              ——————————————— 0 (LOGIC)

FIG. 5B  SDA

FIG. 5C  CLK1

FIG. 5D  Q1

FIG. 5E  $\overline{Q1}$

ST

FIG. 6A  SCL 
———— 1 (LOGIC)
———— 0 (LOGIC)

FIG. 6B  SDA

FIG. 6C  CLK2

FIG. 6D  Q2

FIG. 6E  $\overline{Q2}$

APPARATUS AND METHOD FOR SERIAL DATA COMMUNICATION UTILIZING GENERAL MICROCOMPUTER

BACKGROUND OF THE INVENTION

1. Field of the Invention

The present invention relates generally to a data communication, and more particularly to an apparatus and method for serial data communication which can transmit and receive serial data of an inter intergrated circuit (IIC or $I^2C$) type utilizing a general microcomputer.

2. Description of the Related Art

In a conventional apparatus for serial data communication, serial data is transmitted and received using a hardware for $I^2C$ serial communication built in a microcomputer which is a system controller.

Figure 1A:
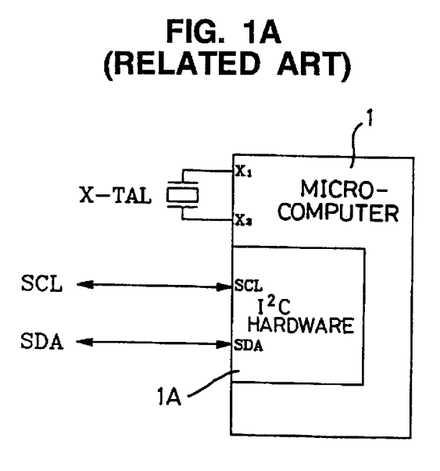
FIG. 1A is a view illustrating the construction of a microcomputer having a built-in hardware for $I^2C$ communication.

FIG. 1A illustrates the construction, of a microcomputer having a built-in $I^2C$ hardware. Referring to FIG. 1A, the $I^2C$ serial communication type data is transmitted or received under the control of the microcomputer 1. Specifically, as shown in FIGS. 2A and 2B, a starting condition for receiving serial data SDA with a serial clock signal SLC, which are externally, received, is detected by the $I^2C$ hardware 1A built in the microcomputer 1.

Figure 1B:
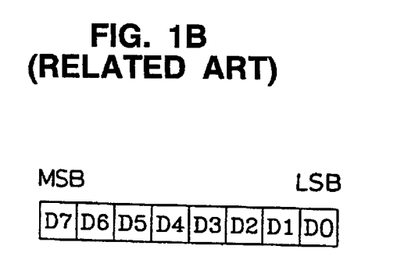
FIG. 1B is a view illustrating the structure of a data register for temporarily storing therein $I^2C$ communication type data per byte transmitted or received.

The received data is temporarily stored byte by byte in a data register IICDR, the construction of which is illustrated in FIG. 1B, being synchronized with the serial clock signal SCL, and then stored in a RAM (random access memory) built in the microcomputer 1.

As a result, the received data is stored byte by byte in the RAM through the data register IICDR to perform the reception of the serial data. Thereafter, if a stop condition is received as shown in FIGS. 2A and 2B, the data reception is thereby terminated.

Figure 2A:
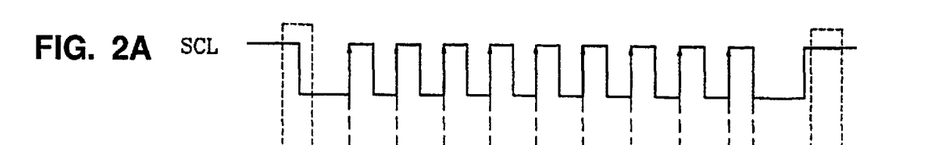
FIGS. 2A and 2B are waveform diagrams illustrating an $I^2C$ communication type serial clock signal and serial data, respectively.
Figure 2B:
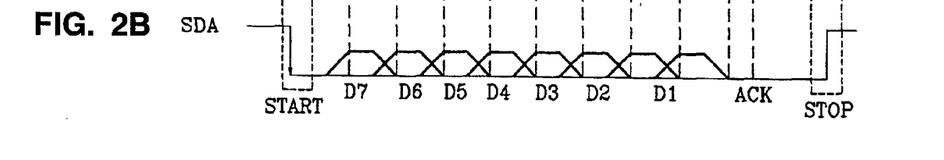
Figure 3:
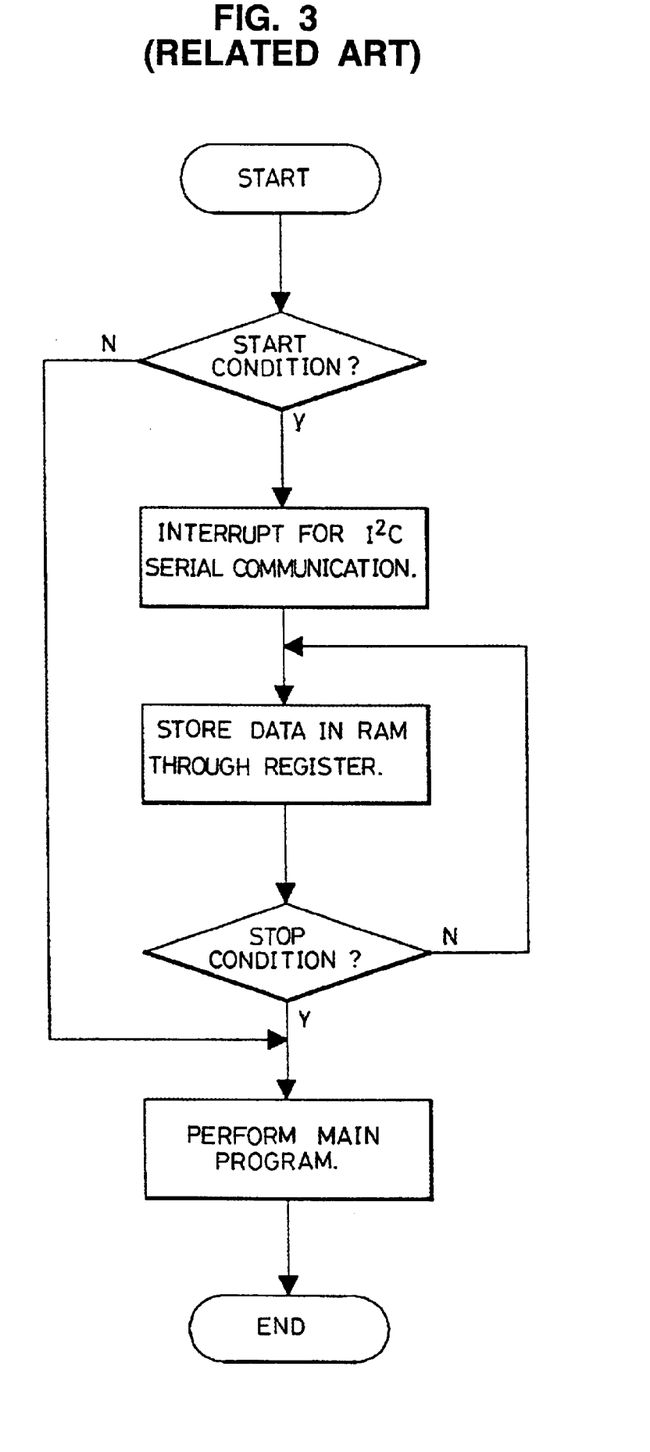
FIG. 3 is an algorithm diagram incorporating the serial data communication process performed by the microcomputer having the built-in $I^2C$ hardware of FIG. 1A.

Meanwhile, in case of data transmission, data to be transmitted is temporarily stored in the data register IICDR, and then transmitted byte by byte after the start condition is generated as shown in FIGS. 2A and 2B. If final data has been transmitted as the data transmission is progressing, the stop condition is generated as shown in FIGS. 2A and 2B to terminate the data transmission. FIG. 3 is an algorithm diagram incorporating the $I^2C$ serial communication type data transmission/reception process utilizing the microcomputer having the built-in $I^2C$ hardware.

As described above, the conventional communication apparatus should employ the $I^2C$ hardware built in the microcomputer to achieve the $I^2C$ serial communication. Otherwise, the $I^2C$ type serial data transmission/reception will be impossible.

SUMMARY OF THE INVENTION

It is an object of the present invention to solve the problems involved in the related art, and to provide an apparatus and method for serial data communication utilizing a general microcomputer which can transmit and receive $I^2C$ serial data without an $I^2C$ serial communication hardware construction built in the microcomputer by detecting start and stop conditions of the serial data communication.

In one aspect of the present invention, there is provided an apparatus for serial data communication which includes start condition detecting means for detecting a start condition for a start of serial data transmission or reception utilizing an input serial clock signal and serial data of an $I^2C$ communication type to provide a start signal, stop condition detecting means for detecting a stop condition for a stop of the serial data transmission or reception utilizing the serial clock signal and serial data to provide a stop signal, and a microcomputer for generating and releasing an interrupt for the serial data transmission or reception in accordance with the start and stop signals provided from the start and stop condition detecting means, respectively, and performing transmission or reception of the serial clock signal and serial data the interrupt is generated.

In another aspect of the present invention, there is provided a method for serial data communication utilizing a general microcomputer which comprises the steps of generating or detecting a start condition for a stars of serial data transmission or reception utilizing an $I^2C$ communication type serial clock signal and serial data, generating an interrupt for transmitting or receiving the serial data and performing the serial data transmission or reception when the start condition is generated or detected, generating or detecting a stop condition for a stop of the serial data transmission or reception utilizing the serial clock signal and serial data, and terminating the serial data transmission or reception when the stop condition is generated or detected.

BRIEF DESCRIPTION OF THE DRAWINGS

The above object, other features and advantages of the present invention will become more apparent by describing the preferred embodiment thereof with reference to the accompanying drawings, in which.

DETAILED DESCRIPTION OF THE PREFERRED EMBODIMENT

Figure 4:
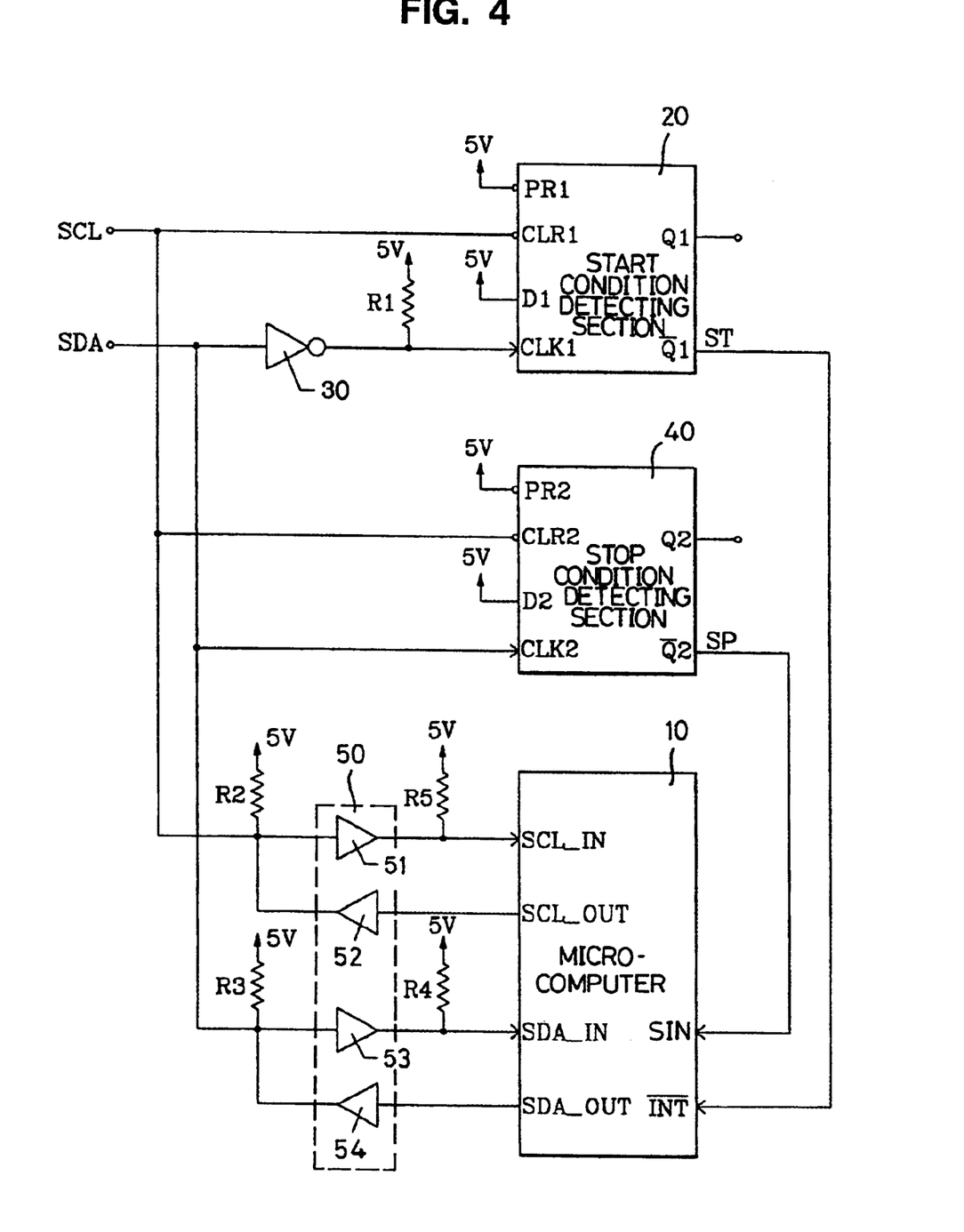
FIG. 4 is a block diagram of the apparatus for $I^2C$ serial data communication utilizing a general microcomputer according to the present invention.

FIG. 4 is a block diagram of the $I^2C$ serial data communication apparatus utilizing a general microcomputer according to the present invention. Referring to FIG. 4, a start condition detecting section 20 receives a serial clock signal SCL and serial data SDA of the $I^2C$ communication type and detects a start condition for the start of serial data transmission/reception to output a corresponding start signal. An inverter 30 inverts the serial data SDA to be inputted to the start condition detection section 20 so that the start condition detecting section 20 can detect the start condition.

A stop condition detecting section 40 receives the serial clock signal SCL and serial data SDA and detects a stop condition for the termination of the serial data transmission/reception to output a corresponding stop signal. As can be seen in FIG. 4, the start and stop condition detecting sections 20 and 40 can be implemented using bi-stable circuits such as flip-flops.

A microcomputer 1C generates or releases an interrupt for the serial data transmission/reception in accordance with the start or stop signal outputted from the start condition detecting section 20 or stop condition detecting section 40. The microcomputer 10 can be implemented using an embedded processor, micro-controller or the like. The microcomputer 10 transmits or receives the serial clock signal SCL and serial data SDA through its serial clock signal input/output terminals SCL-IN and SCL-OUT and serial data input/output terminals SDA-IN and SCL-OUT when the interrupt is generated. A buffering section 50 includes buffers 51 to 54 for buffering the serial clock signal SCL and serial data SDA inputted to or outputted from the microcomputer 10.

In the drawing, the reference numerals R1 to R5 denote current-limiting resistors.

The I²C serial data communicating apparatus utilizing a general microcomputer according to the present invention as described above performs the I²C serial data communication by enabling the microcomputer to detect the start and stop conditions for the I²C communication. The detailed features and operation of the present invention will now be explained with reference to FIGS. 4, 5A to 5E, 6A to 6E, 7, and 8.

First, in case of serial data reception, the serial clock signal SCL and serial data SDA are externally inputted. The serial data SDA is inverted through the inverter 30, and then inputted to the start condition detecting section 20 through its input terminal CLK1, while the serial clock signal SCL is inputted through its input terminal CLR1. Accordingly, the start condition detecting section 20 detects the start condition according to the inputted serial clock signal SCL and serial data SDA, and outputs the start signal ST through its output terminal Q1-bar.

Figure 5A:
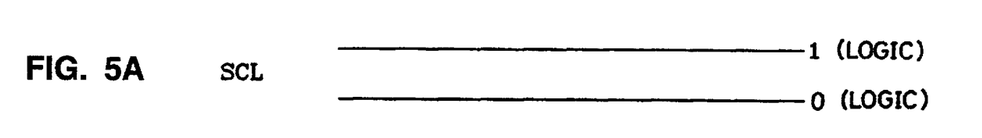
FIGS. 5A to 5E are waveform diagrams appearing at various points of FIG. 4 when the start condition is detected according to the present invention.
Figure 5B:
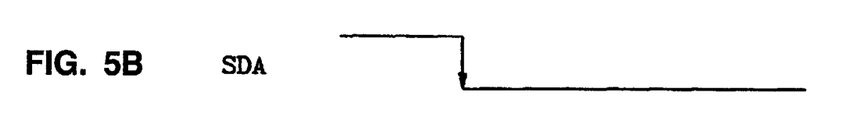
Figure 5C:
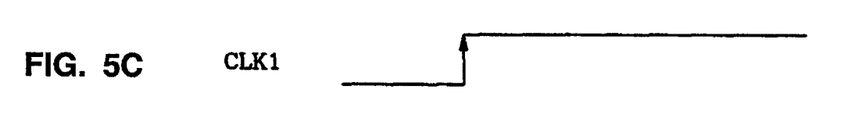
Figure 5D:
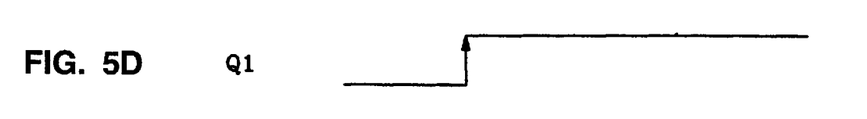
Figure 5E:
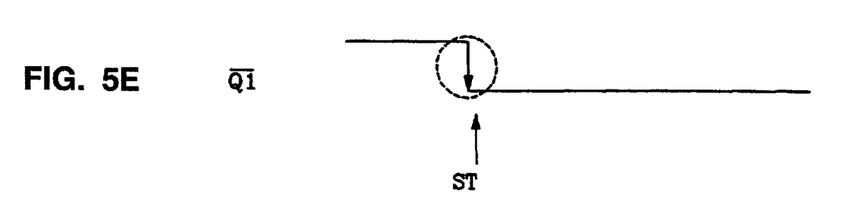

Specifically, the serial data SDA inputted as shown in FIG. 5B is inverted by the inverter 30 and then inputted to the input terminal CLK1 of the start condition detecting section 20 as shown in FIG. 5C, causing the start signal ST as shown in FIG. 5E to be outputted through the output terminal Q1-bar of the start condition detecting section 20. The microcomputer 10 receives the start signal ST outputted from the Start condition detecting section 20 through its interrupt terminal INT-bar, and thus generates the interrupt for receiving the serial clock signal SCL and serial data SDA (steps S10 and S11 of FIG. 7).

Thereafter, the microcomputer 10 receives the serial clock signal SCL and serial data SDA inputted to its input terminal SCL-IN and SDA-IN through the buffers 51 and 53. In detail, the microcomputer 10 stores the serial data SDA byte by byte in a data register built therein at a point when the serial clock signal SCL becomes 'high', decodes the serial data stored in the data register, and then stores the decoded data in a RAM built therein (step S12 of FIG. 7). When the reception of the serial data of 1 byte is completed, the microcomputer 10 outputs through its serial data output terminal SDA-OUT to the transmission part a receipt acknowledgment signal ACK of a 'low' level during the 9th 'high'-level period of the serial clock signal as shown in FIGS. 2A and 2B to give to the transmission part notice that the 1-byte data has been safely received (steps S13 and S14 of FIG. 7).

Figure 6A:
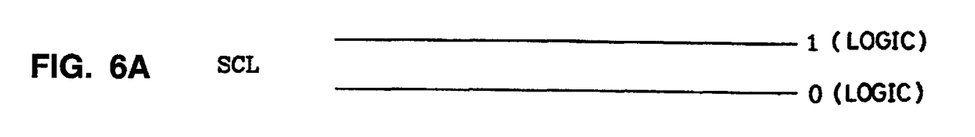
FIGS. 6A to 6E are waveform diagrams appearing at various points of FIG. 4 when the stop condition is detected according to the present invention.
Figure 6B:
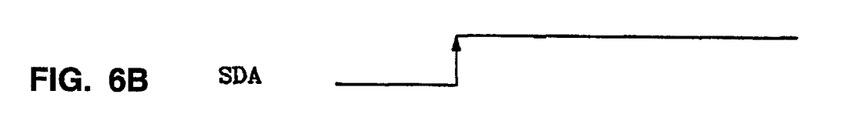
Figure 6C:
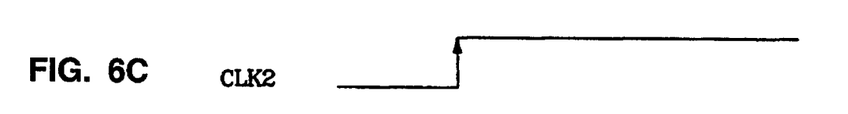
Figure 6D:
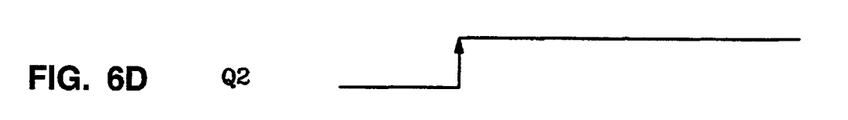
Figure 6E:
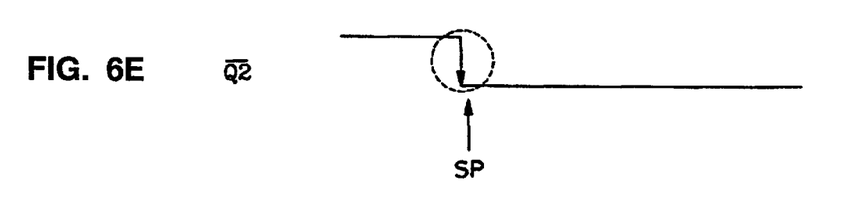
Figure 7:
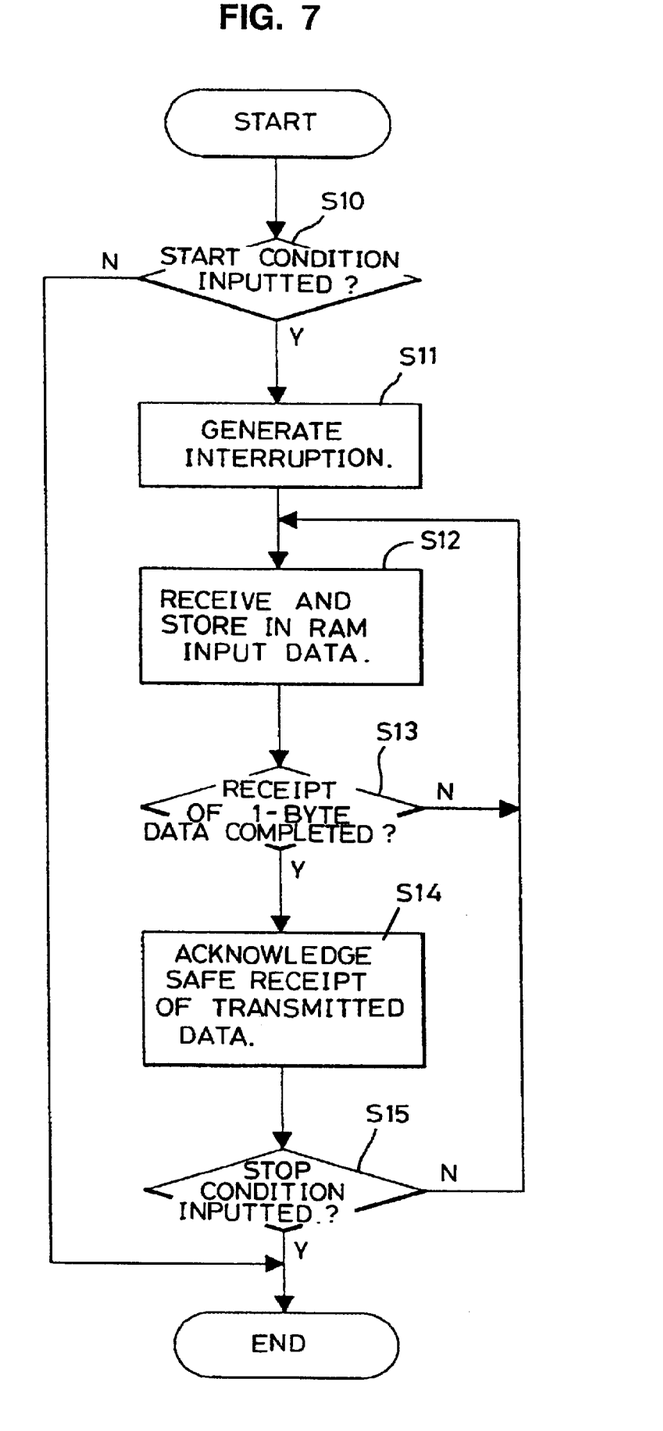
FIG. 7 is an algorithm diagram incorporating the serial data receiving process according to the present invention.

Thereafter, if the stop condition detecting section 40 detects the stop condition of the serial data SDA according to the serial clock signal SLC and serial data SDA inputted thereto, it outputs the stop signal SP through its output terminal Q2-bar. The microcomputer 10 terminates the data reception in response to the 'low'-level stop signal SP inputted through its input terminal SIN as shown in FIG. 6E (step S15 of FIG. 7). Meanwhile, if the output terminal Q2-bar of the stop condition detecting section 40 is kept 'high', the I²C serial data receiving operation is continuously performed.

Figure 8:
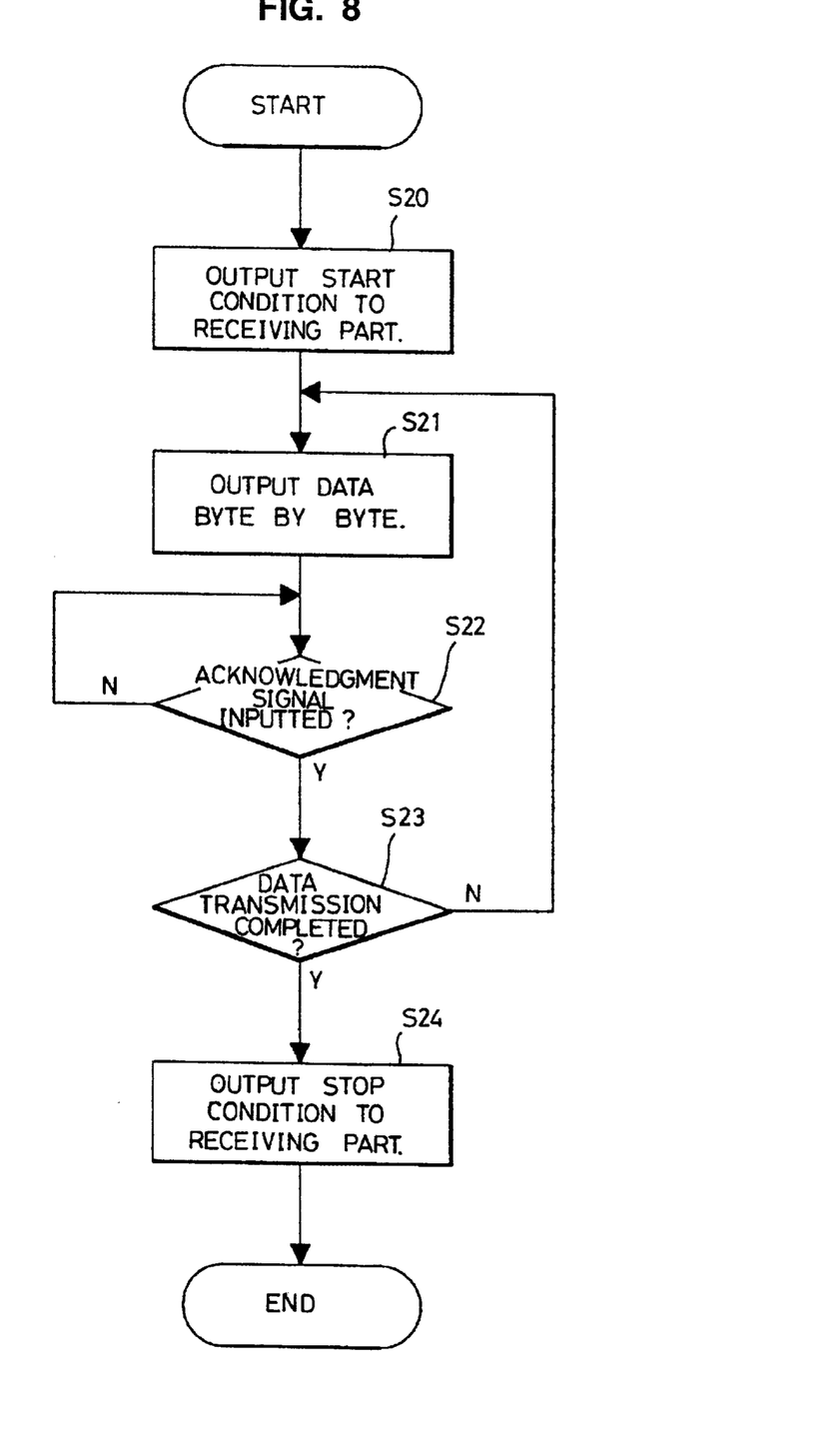
FIG. 8 is an algorithm diagram incorporating the serial data transmitting process according to the present invention.

In case of data transmission, the microcomputer 10 first transmits the start condition to the receiving part utilizing the serial clock signal SCL and serial data SDA outputted through its output terminals SCR-OUT and SDA-OUT, and then transmits the serial data SDA of 1 byte (steps S20 and S21 of FIG. 8). Specifically,, every time when the serial clock signal SCL outputted through the output terminal SCL-OUT goes to a 'low' level, the microcomputer 10 sequentially outputs a bit of the serial data SDA.

Thereafter, during the 9th 'high'-level period of the serial clock signal SCL, the microcomputer 10 checks its input terminal SDA-IN and determines whether the receipt acknowledgment signal ACK of a 'low' level is inputted from the receiving part (Step S22 of FIG. 8). If it is determined that the receipt acknowledgment signal ACK has been inputted, the data transmission byte by byte continues as described above.

When the data transmission is completed (step S23 of FIG. 8), the microcomputer 10 outputs to the receiving part the stop condition utilizing the serial clock signal SCL and serial data SDA (step S24 of FIG. 8) to terminate the data transmission.

As described above, the present invention enables the I²C serial data communication using a general microcomputer having no built-in hardware for the I²C communication, thereby reducing the manufacturing cost of the communication device.

While the present invention has been described and illustrated herein with reference to the preferred embodiment thereof, it will be understood by those skilled in the art that various changes in form and details may be made therein without departing from tho spirit and scope of the invention.

What is claimed:

1. An apparatus for serial data communication utilizing a general microcomputer, comprising:

a start condition detector for detecting a start condition for a start of serial data transmission or reception utilizing a serial clock signal and serial data of an inter integrated circuit (I²C) communication type to provide a start signal;

a stop condition detector for detecting a stop condition for a stop of said serial data transmission or reception utilizing said serial clock signal and serial data to provide a stop signal; and a controller for generating and releasing an interrupt for said serial data transmission or reception in accordance with said start and stop signals provided from said start and stop condition detecting means, respectively, and performing transmission or reception of said serial clock signal and serial data when said interrupt is generated, said controller including a random access memory built therein for storing said serial data transmitted or received therethrough.

2. An apparatus for serial data communication utilizing a general microcomputer, comprising:

a start condition detector for detecting a start condition for a start of serial data transmission or reception utilizing a serial clock signal and serial data of an inter integrated circuit (I$^2$C) communication type to provide a start signal;

a serial data converter for converting said serial data inputted to said start condition detector so that said start condition detector can detect said start condition according to said converted serial data;

a stop condition detector for detecting a stop condition for a stop of said serial data transmission or reception utilizing said serial clock signal and serial data to provide a stop signal; and a controller for generating and releasing an interrupt for said serial data transmission or reception in accordance with said start and stop signals provided from said start and stop condition detector, respectively, and performing transmission or reception of said serial clock signal and serial data when said interrupt is generated.

3. An apparatus for serial data communication as claimed in claim 2, wherein said serial data converter comprises an inverter.

4. An apparatus for serial data communication utilizing a general microcomputer, comprising:

a start condition detector for detecting a start condition for a start of serial data transmission or reception utilizing a serial clock signal and serial data of an inter integrated circuit (I$^2$C) communication type to provide a start signal;

a stop condition detector for detecting a stop condition for a stop of said serial data transmission or reception utilizing said serial clock signal and serial data to provide a stop signal;

a controller for generating and releasing an interrupt for said serial data transmission or reception in accordance with said start and stop signals provided from said start and stop condition detector, respectively, and performing transmission or reception of said serial clock signal and serial data when said interrupt is generated; and buffers for buffering said serial clock signal and serial data inputted to or outputted from said control means.

* * * * *